United States Patent
Ramakrishnappa et al.

(10) Patent No.: US 10,642,233 B2
(45) Date of Patent: May 5, 2020

(54) DEVICE ENROLLMENT IN A BUILDING AUTOMATION SYSTEM AIDED BY AUDIO INPUT

(71) Applicant: Ademco Inc., Golden Valley, MN (US)

(72) Inventors: Harish M. Ramakrishnappa, Bangalore (IN); Ravikumar Vemagal Aswath, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 433 days.

(21) Appl. No.: 14/987,477

(22) Filed: Jan. 4, 2016

(65) Prior Publication Data

US 2017/0192399 A1    Jul. 6, 2017

(51) Int. Cl.
| | |
|---|---|
| G05B 15/02 | (2006.01) |
| H04W 4/80 | (2018.01) |
| G10L 15/22 | (2006.01) |
| G08B 25/00 | (2006.01) |
| G08B 13/22 | (2006.01) |
| G10L 15/08 | (2006.01) |

(52) U.S. Cl.
CPC ............ *G05B 15/02* (2013.01); *G08B 13/22* (2013.01); *G08B 25/003* (2013.01); *G10L 15/083* (2013.01); *G10L 15/22* (2013.01); *H04W 4/80* (2018.02); *G10L 2015/088* (2013.01); *G10L 2015/223* (2013.01)

(58) Field of Classification Search
CPC ..................................................... H04W 4/80
See application file for complete search history.

(56) References Cited

U.S. PATENT DOCUMENTS

| | | |
|---|---|---|
| 5,481,714 A | 1/1996 | Pipkin et al. |
| 6,477,493 B1 | 11/2002 | Brooks et al. |
| 6,624,750 B1 | 9/2003 | Marman et al. |
| 7,042,349 B2 | 5/2006 | Bergman et al. |
| 7,113,090 B1 | 9/2006 | Saylor et al. |

(Continued)

FOREIGN PATENT DOCUMENTS

| | | |
|---|---|---|
| WO | 0021053 A1 | 4/2000 |
| WO | 2006033760 | 3/2006 |
| WO | 2014004911 | 1/2014 |

OTHER PUBLICATIONS 2 gig Technologies, "Go Control Wireless Security System, Installation & Programming Instructions," 52 pages, 2010.

(Continued)

*Primary Examiner* — Santosh R Poudel
(74) *Attorney, Agent, or Firm* — Husch Blackwell LLP (57) ABSTRACT

This disclosure generally relates to building automation systems, and more particularly to device enrollment techniques in a Building Automation System (BAS). In one example, the Building Automation System includes a central controller and one or more remote sensors/devices. The central controller is initially placed into its enrollment mode. An installer may then walk around the building uttering a predetermined verbal word or phrase. When a sensor/device hears the predetermined verbal word or phrase, the corresponding sensor/device enters its enrollment mode, and then becomes enrolled with the central controller of the Building Automation System. In some cases, the Building Automation System may include a security system.

10 Claims, 6 Drawing Sheets

(56) References Cited

U.S. PATENT DOCUMENTS

| | | |
|---|---|---|
| 7,119,658 B2 | 10/2006 | Stilp |
| 7,183,907 B2 | 2/2007 | Simon et al. |
| 7,634,504 B2 | 12/2009 | Amundson |
| 7,675,402 B2 | 3/2010 | Lee et al. |
| 8,699,944 B2 * | 4/2014 | Malamud ............ H04L 63/0861 455/39 |
| 8,918,219 B2 | 12/2014 | Sloo et al. |
| 8,976,937 B2 | 3/2015 | Shapiro et al. |
| 9,043,210 B1 * | 5/2015 | Adcock ................ G10L 15/183 379/88.01 |
| 2004/0215750 A1 | 10/2004 | Stilp |
| 2006/0282649 A1 * | 12/2006 | Malamud ............ H04L 63/0861 712/26 |
| 2007/0247301 A1 * | 10/2007 | Browne ............. G08B 13/1672 340/506 |
| 2008/0072314 A1 | 3/2008 | Frenette |
| 2011/0260832 A1 * | 10/2011 | Ross ....................... G06F 21/32 340/5.84 |
| 2012/0116748 A1 * | 5/2012 | Kore .................... G06F 17/289 704/2 |
| 2013/0035774 A1 | 2/2013 | Warren et al. |
| 2013/0077797 A1 * | 3/2013 | Hoy ......................... G08B 3/10 381/56 |
| 2014/0153281 A1 | 6/2014 | Zilao et al. |
| 2014/0195233 A1 * | 7/2014 | Bapat ...................... G10L 15/30 704/246 |
| 2014/0266687 A1 | 9/2014 | Britton |
| 2015/0077553 A1 | 3/2015 | Dawes |
| 2015/0187354 A1 * | 7/2015 | Kim ........................ G10L 15/22 704/246 |
| 2015/0276254 A1 | 10/2015 | Nemcek et al. |
| 2015/0279134 A1 * | 10/2015 | Warren ............. G07C 9/00039 340/5.85 |
| 2015/0324179 A1 * | 11/2015 | Nye ........................ G10L 15/00 704/275 |
| 2016/0134632 A1 * | 5/2016 | Cregg ..................... H04L 63/10 398/40 |
| 2016/0360526 A1 * | 12/2016 | Lehmann ............ H04L 65/4076 |
| 2017/0019362 A1 * | 1/2017 | Kim ...................... H04L 51/10 |
| 2018/0367944 A1 * | 12/2018 | Heo ...................... H04W 12/06 |

OTHER PUBLICATIONS

The Extended European Search Report for EP Application Serial No. 16204901.9, dated Apr. 28, 2017.

* cited by examiner

FIG. 6 ns in a building automation system.

DEVICE ENROLLMENT IN A BUILDING AUTOMATION SYSTEM AIDED BY AUDIO INPUT

TECHNICAL FIELD

The disclosure generally relates to building automation systems, and more particularly to device enrollment techniques in a building automation system.

BACKGROUND

Building Automation Systems (BAS) are used to control one of more functions of a building. A Building Automation System can include, for example, an HVAC system, a lighting control system, a fire suppression systems, a security system, and/or any other suitable building automation system. A Building Automation System typically includes one or more sensors and/or other devices that are operatively coupled to a central controller or the like, often via wireless communication. During installation of the Building Automation System, an installer typically must enroll each of the sensors and/or other devices so that the central controller recognizes each device and places each device under the control of the central controller.

In many cases, enrollment is initiated by pressing an "enroll" button on the central controller. This causes the central controller to enter an enrollment mode and to listen for new devices to enroll. The installer then typically moves about the building and individually places each of the new sensor/devices into an enrollment mode. In some cases, this is accomplished by press an "enroll" button or the like on each of the new sensor/devices.

Placing the new sensor/devices into an enrollment mode often involves using a ladder or the like to reach each of the devices and manually place the sensor/devices in the enrollment mode. For Building Automation Systems that have many devices spaced around a building, the can be time consuming and tedious. Once in the enroll mode, the new sensor/devices typically transmit a new device message, which is received by the central controller. At this point, the new sensor/devices have no assigned address in the Building Automation System. The central controller may automatically enroll the associated new devices into the Building Automation System, which in many cases includes assigning a Building Automation System address to the new sensor/devices and transmitting the assigned addresses to the new sensor/devices.

What would be desirable are improved methods and systems for enrolling new sensor/devices in Building Automation Systems.

SUMMARY

This disclosure generally relates to building automation systems, and more particularly to device enrollment techniques in a Building Automation System (BAS). In one example, the Building Automation System includes a central controller and one or more remote sensors/devices. The central controller is initially placed into its enrollment mode. An installer may then walk around the building uttering a predetermined verbal word or phrase. When a sensor/device hears the predetermined verbal word or phrase, the corresponding sensor/device may automatically enter its enrollment mode, and then becomes enrolled with the central controller of the Building Automation System. In some cases, the Building Automation System may include a security system.

In some cases, the sensor/device may include a communication port, a microphone and a controller operatively coupled to the communication port and the microphone. The controller may be configured to: receive an audio signal via the microphone; determine if the received audio signal matches a predetermined audio signal template; and enter an enrollment mode if the received auto signal matches the predetermined audio signal template. This is just one example.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure generally relates to building automation systems, and more particularly to device enrollment techniques in a Building Automation System (BAS). The Building Automation System (BAS) may include one or more of an HVAC system, a lighting control system, a fire suppression systems, a security system and any other suitable building automation system. For clarity, the following description will be described with respect to a security system, but the present disclosure is not so limited. Rather, the present methods and systems may be applied to any suitable Building Control System (BAS).

Figure 1:
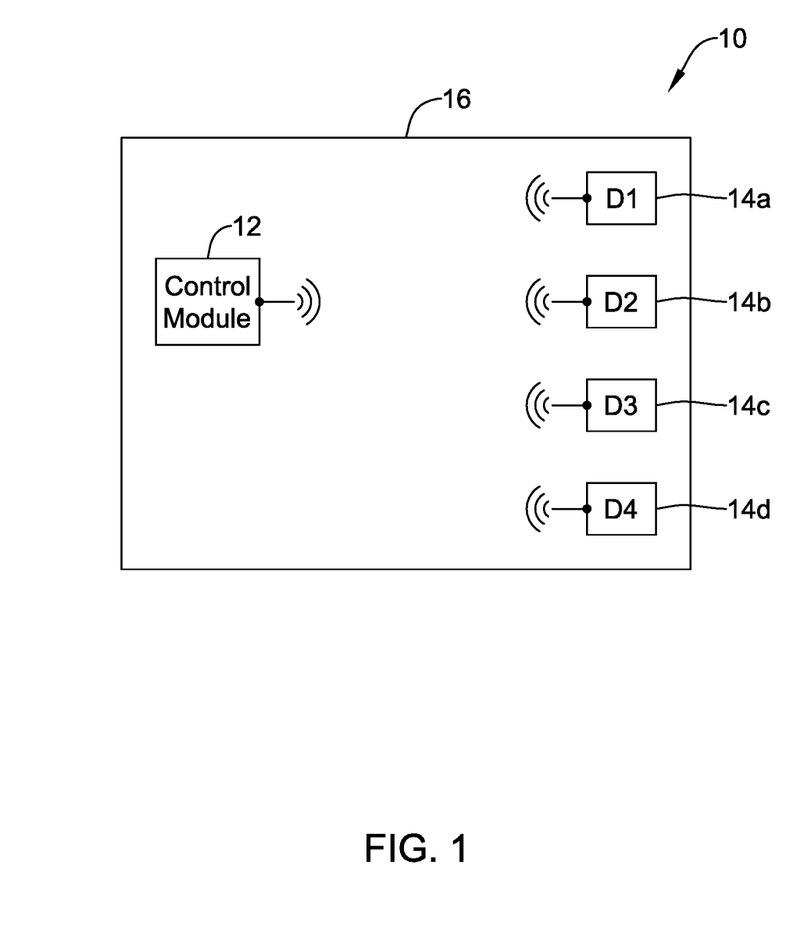
FIG. 1 is a block diagram of an illustrative security system.
Figure 2:
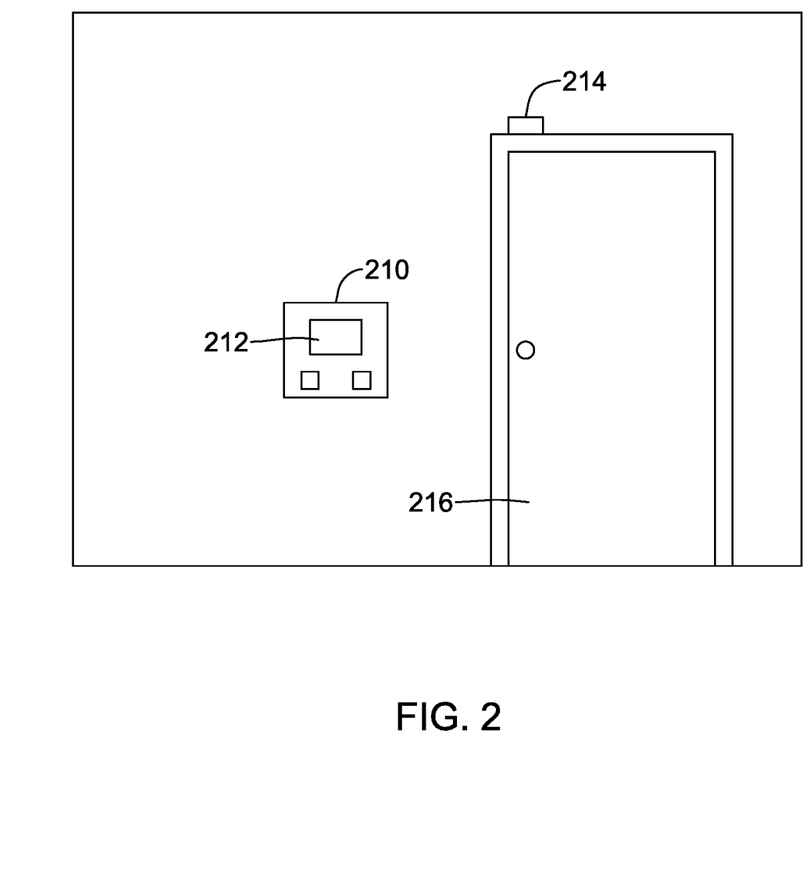
FIG. 2 is a schematic view of an illustrative control panel and sensor.

FIG. 1 depicts an illustrative security system 10 that includes a central controller 12 and a number of sensors/devices 14a-14d. The sensor/devices 14a-14d may be configured to detect threats within a secured area 16. In some cases, some of the sensor/devices 14a-14d may be constructed to detect different threats. For example, some of the sensor/devices 14a-14d may be limit switches located on doors and windows of the secured area 16, which are activated by entry of an intruder into the secured area 16 through the doors and windows. FIG. 2 shows a door sensor 214 (e.g. limit switch) that can detects the opening/closing of door 216. FIG. 2 also shows a control panel 210 that includes the central controller 12 or is operatively connected to the central controller 12. Other suitable security sensor/devices 14a-14d may include fire, smoke, carbon monoxide and/or natural gas detectors, to name a few. Still others suitable security system sensor/devices 14a-14d may include motion sensors that detect motion of intruders in the secured area 16. In some cases, one or more of the sensor/devices 14a-14d may include a video camera. In some cases, the sensor/devices 14a-14d may include a horn or alarm, a damper actuator controller (e.g. that closes a damper during a fire event), a light controller for automatically turning on/off lights to simulate occupancy, and/or any other suitable device/sensor. These are just examples. More generally, the sensor/devices 14a-14d may be any type of sensor or device suitable for operation in a building automation system.

During operation of the illustrative security system 10, the central controller 12 monitors the status of each of the sensor/devices 14a-14d. Upon detecting a change of status in one of the sensor/devices 14a-14d, the central controller may activate an alarm device, record and/or transmit live video from one of the sensor/devices 14a-14d, operate an actuator, contact an off-site central monitoring station (not shown), and/or perform any other suitable action.

Figure 3:
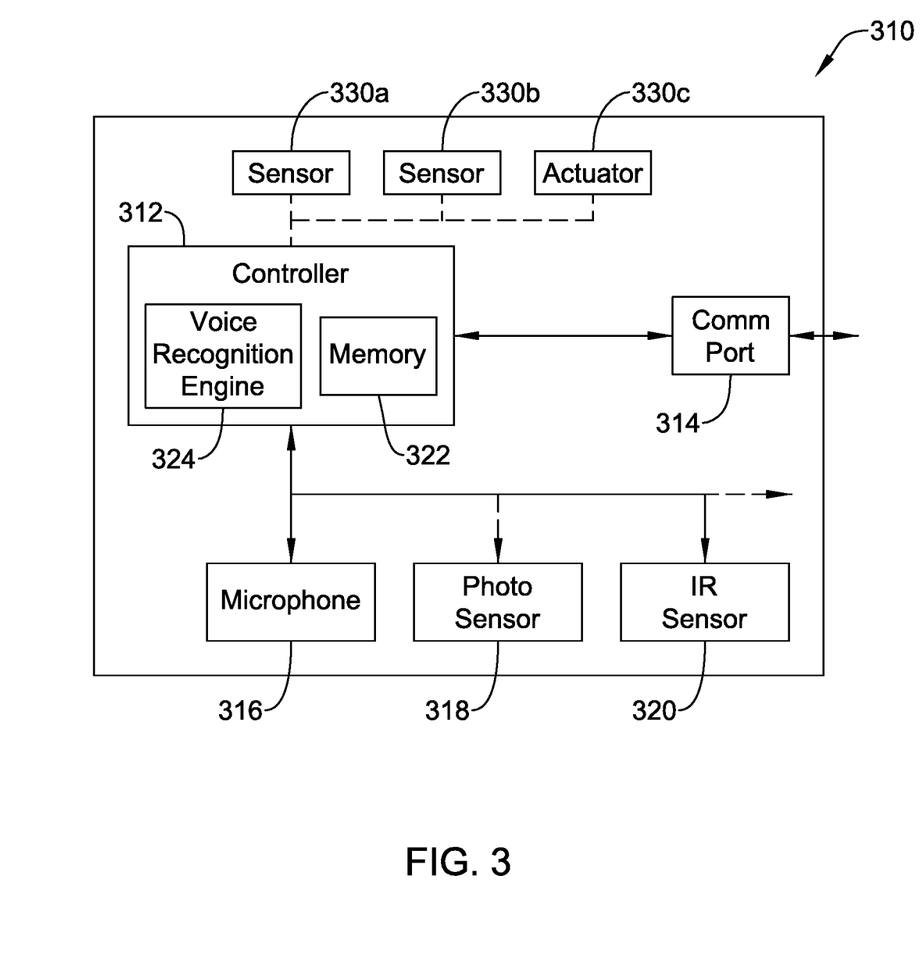
FIG. 3 is a block diagram of an illustrative security system sensor.

Each of the sensor/devices 14a-14d may be operatively connected to the central controller 12 via a corresponding communications port 314 (see FIG. 3). It is contemplated that the communications port 314 may be wired and/or wireless. When the communications port 314 is wireless, the communications port 314 may include a wireless transceiver, and the central controller 12 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

Prior to operation of the security system 10, each of the sensor/devices 14a-14d must be enrolled with the central controller 12 so that the central controller 12 recognizes each of the sensor/devices 14a-14d and places each of the sensor/devices 14a-14d under the control of the central controller 12. In one example, enrollment is initiated by placing the central controller 12 into an enrollment mode. This can be accomplished by, for example, pressing an "enrollment" button on the central controller 12, interacting with a user interface (e.g. control panel 210, cell phone, tablet computer, etc.) that is operatively connected to the central controller 12 to place the central controller 12 into the enrollment mode, or in any other suitable manner. Once in the enrollment mode, the central controller may listen for new sensor/devices 14a-14d for enrollment into the security system 10.

The installer then may moves about the building and places each of the new devices into its enrollment mode. In some cases, this is accomplished by walking around the building and annunciating a predetermined enrollment trigger word or phrase. A microphone associated with a new sensor/device 14a-14d that is in audible range of the installer may receive the spoken word or phrase of the installer as the installer walks near the new sensor/devices 14a-14d. A controller of the new sensor/device 14a-14d may then determine if the received spoken word or phrase corresponds to the predetermined enrollment trigger word or phrase. If so, the controller of the new sensor/device 14a-14d may enter its enrollment mode. In some cases, once in the enrollment mode, the controller 312 of the new sensor/device 14a-14d may transmit a new device message to the central controller 12, which may include a unique sensor/device identifier such as a MAC address or the like. The new device message may be received by the central controller 12. In response, the central controller 12 may enroll the new sensor/device 14a-14d into the security system 10. This may include, for example, assigning a security system address to the new sensor/device and transmitting the assigned security system address to the new sensor/device 14a-14d. In some cases, after the new sensor/device 14a-14d is successfully enrolled, the new sensor/device 14a-14d may provide an enrollment acknowledgment to the installer, such as a beep, a flash or the like.

Rather than using a predetermined enrollment trigger word or phrase, it is contemplated that each of the new sensor/devices 14a-14d may enter its enrollment mode in response to other trigger stimulus provided by the installer. For example, it is contemplated that the new sensor/devices 14a-14d may enter the enrollment mode in response to a predetermined pattern of audio tones, sometimes generated by a mobile device such as a smartphone, tablet computer, laptop computer and/or any other suitable device. In some cases, the predetermined pattern of audio tones may include a plurality of audio tones spaced along in a predetermined time pattern, a plurality of audio tones of different amplitudes, a plurality of audio tones of different frequencies, a plurality of audio tones of different amplitudes, different frequencies and spaced along a predetermined time pattern, a predetermined song, and/or any other suitable audio trigger.

Alternatively, or in addition, the trigger stimulus may be optical. For example, a new sensor/devices 14a-14d may include a light sensor 318, IR sensor (e.g. passive infrared based motion sensor), 320 or any other suitable optical sensor. When so provided, the trigger stimulus may include a predetermined pattern of optical pulses. In some cases, the predetermined pattern of optical pulses may include a plurality of optical pulses spaced along in a predetermined time pattern, a plurality of optical pulses of different amplitudes, a plurality of optical pulses of different frequencies, a plurality of optical pulses of different amplitudes, different frequencies and spaced along in a predetermined time pattern, and/or any other suitable optical trigger.

It is contemplated that the new sensor/devices 14a-14d may be enrolled in a particular order such that the central controller 12 associates each new sensor/devices 14a-14d with a location in which it is installed. In other instances, it is contemplated that a voice command can be recognized by each new sensor/devices 14a-14d that also names or identifies the particular new sensor/devices 14a-14d. For example, the installer may say the phrase "Begin sensor enrollment, front door." The first part of the phrase ("begin sensor enrollment") may be the predetermined enrollment trigger word or phrase to begin the enrollment process, while the second part of the phrase ("front door") may be the assigned name of the new sensor/devices 14a-14d.

FIG. 3 is a block diagram of an illustrative security system sensor 310, which may correspond to one of sensor/devices 14a-14d of FIG. 1. Illustrative sensor 310 includes a controller 312, a communication port 314 and a trigger stimulus sensor. The trigger stimulus sensor may be any sensor that is suitable for detecting a predetermined trigger stimulus. In some cases, the trigger stimulus sensor may include a microphone 316, a light sensor 318, and/or an IR sensor 320 as shown.

It is contemplated that the communications port 314 may be a wired and/or a wireless communication port. In either case, the communications port 314 is configured to operatively communicate, either directly or indirectly, with a central controller such as central controller 12 of FIG. 1. When the communications port 314 is wireless, the communications port 314 may include a wireless transceiver that is compatible with the wireless transceiver of a central controller 12. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The controller 312 is configured to receive a trigger stimulus from a trigger stimulus sensor. For example, when the sensor 310 includes the microphone 316 as a trigger stimulus sensor, the controller may receive an audio signal from the microphone 316. For example, the microphone 316 may pick up a spoken word or phrase of an installer as the installer walks near the sensor 310. The controller 312 may process the received audio signal and determine if the received spoken word or phrase corresponds to a predetermined enrollment trigger word or phrase. The predetermined enrollment trigger word or phrase, and/or a predetermined audio signal template that corresponds to the predetermined enrollment trigger word or phrase, may be stored in a memory 322 of the controller 312.

In some cases, determine if the received spoken word or phrase corresponds to the predetermined enrollment trigger word or phrase may be aided by a voice recognition engine 324. In some cases, the voice recognition engine 324 may use natural language processing to recognize spoken words. In some cases, voice recognition engine 324 may use voice biometrics to help reduce interference and to reduce false triggers during the enrollment process. An example predetermined enrollment trigger word or phrase may be "Begin sensor enrollment". In some cases, the installer may enter a custom predetermined enrollment trigger word or phrase by entering a programming mode of the sensor 310.

In some cases, after the sensor 310 has been successfully enrolled with a security system, the controller 312 may deactivate the voice recognition engine 324 so that the controller 312 does not consume power determining if subsequent received spoken words or phrases corresponds to the predetermined enrollment trigger word or phrase, but this is not required. In some cases, the voice recognition engine 324 may remain active after a successful enrollment, so that other audible commands can be recognized and executed, such as a system check command (see FIG. 6).

It is contemplated that the predetermined enrollment trigger word or phrase that is used to initiate the enrollment process of the sensor 310 may also be used to name or identify the sensor 310 in the security system. For example, the installer may say the phrase "Begin sensor enrollment, front door." The first part of the phrase ("begin sensor enrollment") may be the verbal command to begin the enrollment process, while the second part of the phrase ("front door") may be the assigned name of the sensor 310. The voice recognition engine 324 of the controller 312 may parse the predetermined enrollment trigger word or phrase to separately identify the first and second part of the phrase. In some instances, the assigned name of the sensor 310 may be provided as a separate verbal command, with a different prefix like "Name Sensor, Front Door". The prefix "Name Sensor" may be a recognizable trigger phrase, which is immediately followed by the desired name of the sensor 310. In either case, the sensor name may be communicated to the central controller 12 via the communications port 314 of sensor 310, and the central controller 12 may associate the sensor name with the sensor 310 as the sensor 310 is enrolled. The sensor name may be displayed on a control panel, such as control panel 210, when the sensor 310 is triggered during subsequent operation of the security system 10.

In some cases, the sensor 310 may include one or more additional sensors 330a-330b beyond the trigger sensor(s) 316, 318, 320. In the example shown, additional sensors 330a-330b may include a motion sensor, a video camera, a temperature sensor, a smoke sensor, a gas sensor, and/or any other sensor suitable for sensing one or more conditions within the secured area 16. In some cases, such additional sensors 330a-330b may not be needed or desired. For example, once the sensor 310 is enrolled, one or more of the trigger sensor(s) 316, 318, 320 may function as one or more of the sensors for sensing one or more conditions within the secured area 16. For example, the microphone 316 may be used during enrollment of the sensor 310 to pick up an audible trigger stimulus as the installer walks near the sensor 310. However, after enrollment of the sensor 310, the microphone 316 may be used to detect glass breakage in the secured area 16, and in response to a detected glass breakage event, the controller 312 of the sensor 310 may communicate a glass breakage event to the central controller 12. In another example, the IR sensor 320 may be used during enrollment of the sensor 310 to detect an optical trigger stimulus. However, after enrollment of the sensor 310, the IR sensor 320 may be used to detect motion in the secured area 16, and in response to a detected motion event, the controller 312 of the sensor 310 may communicate a motion event to the central controller 12. These are just some examples.

In some cases, the sensor 310 may include an actuator 332. The actuator may be, for example, a horn, a damper actuator, a valve actuator, garage door actuator, and/or any other suitable actuator. In response to a detected event by the one or more additional sensors 330a-330b (and/or sensors 316, 318 or 320 when used after enrollment), the controller 312 may be configured to actuate actuator 332, such as close a damper in response to a smoke event detected by a smoke sensor.

During operation of the security system 10, the central controller 12 may monitor the status of each of the sensor/devices 14a-14d. Upon detecting a change of status of one of the sensor/devices 14a-14d, the central controller 12 may activate an alarm device, record and/or transmit live video from one of the sensor/devices 14a-14d, operate an actuator, contact an off-site central monitoring station (not shown), and/or perform any other suitable action.

During installation of the security system 10, the installer may install a control panel 210 and one or more sensor/devices 214, as shown in FIG. 2. In the example of FIG. 2, the control panel 210 may be mounted near a commonly used entry/exit point, such as a door 216. The control panel 210 may include a display 212, and may also accept inputs from the user. It is contemplated that the control panel 210 may include the central controller 12 or may be operatively connected to the central controller 12. The illustrative security system may include a plurality of sensor/devices configured to monitor a state of the secured area 16. In FIG. 2, a limit-switch 214 is placed adjacent to the door 216 to detect the opening of said door 216. This is just one example sensor. The system may include any number of sensors and in any configuration desired.

Figure 4:
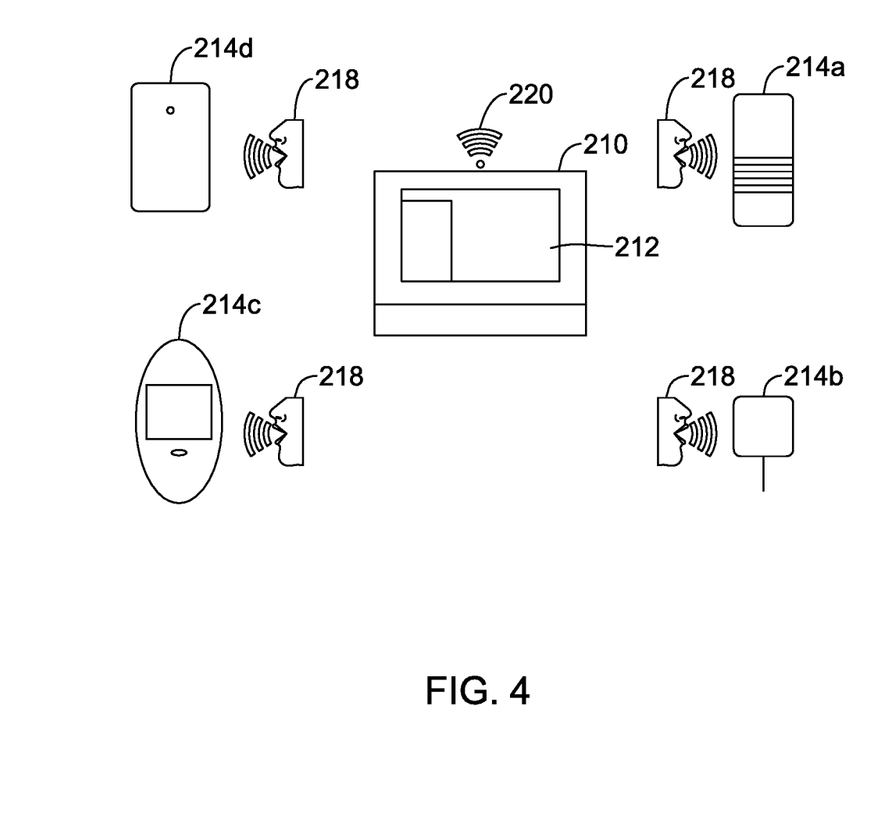
FIG. 4 is a schematic view of voice enrolling one or more sensors.

Once the control panel 210 and the sensor/devices 214a-214d have been mounted in their desired locations, the installer may use the user interface 212 of the control panel 210 to place the central controller 12 into an enrollment mode. Once the central controller 12 has been placed in the enrollment mode, the installer 218 may walk around the premises saying out loud the predetermined enrollment trigger word or phrase (e.g. a spoken verbal command). As shown in FIG. 4, the installer may walk around saying out loud the predetermined enrollment trigger word or phrase to each sensor/devices 214a-214d, which causes each of the sensor/devices 214a-214d to enter the enrollment mode as they pick up the audible enrollment trigger word or phrase. In some case, the installer may walk to each sensor/devices 214a-214d location prior to speaking the predetermined enrollment trigger word or phrase. The distance the installer must stand from the sensor/devices 214a-214d may be determined by the sensitivity of the microphone/sensors 214a-214d. In one example, an installer may need to stand within a few feet or within a few yards of a sensor for the spoken verbal command to be properly picked up and recognized by the corresponding sensor. If the controller 312 of the corresponding sensor/device 214a-214d finds a match between the sequence of words spoken by the installer and the predetermined enrollment trigger word or phrase, the corresponding sensor/device 214a-214d may enter its enrollment mode and initiate a wireless communication 220 with the central controller 12 to enroll or register the corresponding sensor/device 214a-214d with the central controller 12. Once each of the sensor/devices 214a-214d has been enrolled with the central controller 12, the security system 10 may be functional and ready for service.

In some instances, the central controller 12 may be placed in a checkout mode after all of the sensor/devices 214a-214d are enrolled. Once in the checkout mode, the installer 218 may walk around the premises saying out loud a predetermined checkout trigger word or phrase to trip each of the sensor/devices 214a-214d. Once the installer has verified that each of the sensor/devices 214a-214d can be tripped and the central controller 12 recognize the trip events, the installer can feel comfortable that each of the sensor/devices 214a-214d has been properly enrolled and is functioning properly. The installer may then exit the enrollment and/or checkout mode.

Figure 5:
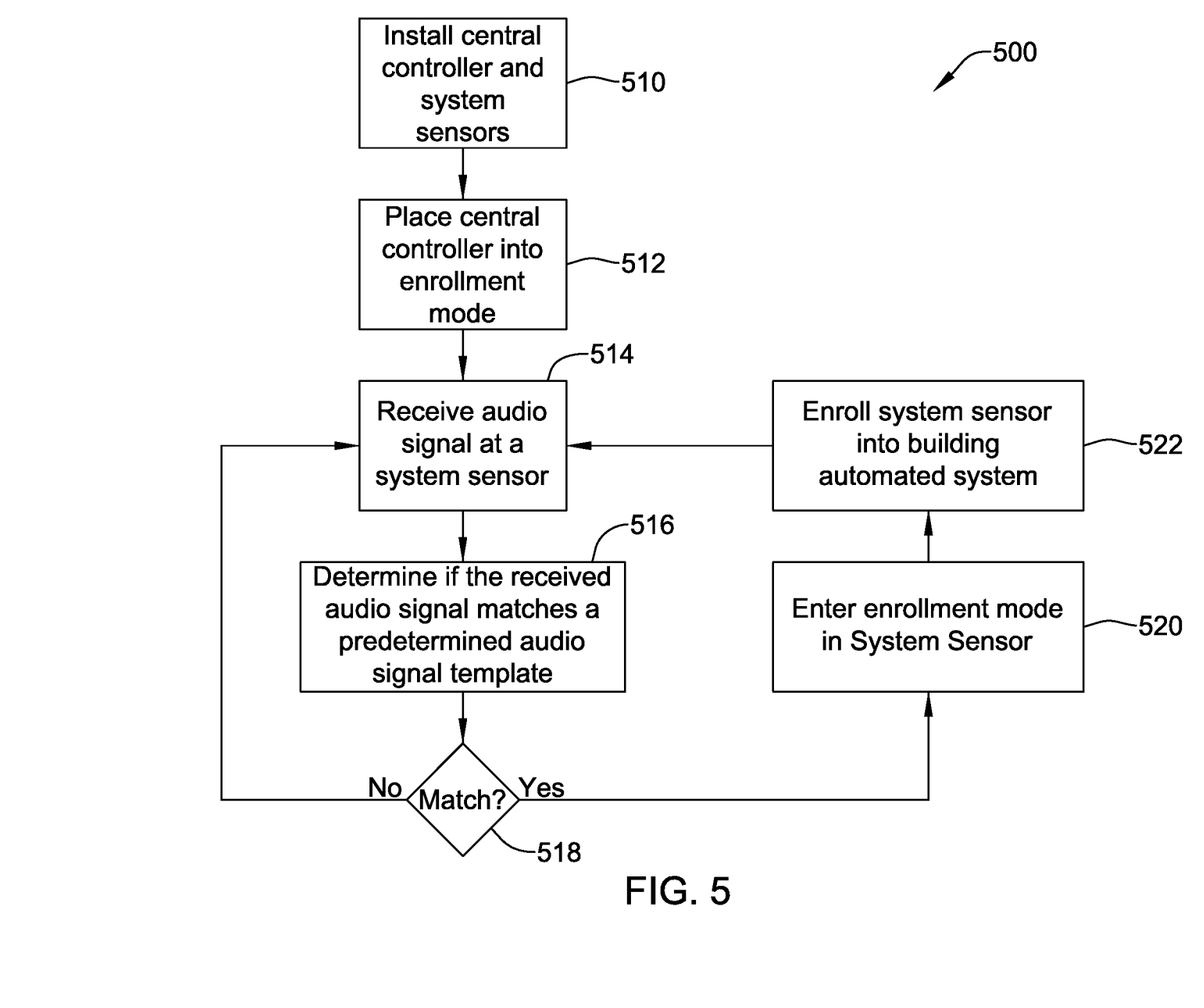
FIG. 5 is a flow chart of an illustrative method for installing a building automation system such as security system.

FIG. 5 is a flow chart of an illustrative method for installing a building automation system such as security system in a building. The method is generally shown at 500, and begins by installing a building automation system that includes a central controller and one or more system sensors as shown at 510. Once installed, the central controller is placed into an enrollment mode, as shown at 512. Then, the installer may walk around the building uttering a predetermined audible enrollment trigger word or phrase. One of the system sensors may receive the uttered audible enrollment trigger word or phrase as an audio signal, as shown at 514. The system sensor may then determine if the received audio signal matches a predetermined audio signal template, as shown at 516. The predetermined audio signal template may correspond to the predetermined enrollment trigger word or phrase discussed above. As shown at 518, if the system sensor determines that the received audio signal does not match the predetermined audio signal template, control is passed back to 514, wherein the system sensor may continue to receive audio signals. If, however, the system sensor determines that the received audio signal does match the predetermined audio signal template, control is passed to 520 and the system sensor enters its enrollment mode. In the enrollment mode, the system sensor may communicate with the central controller of the building automation system, and receive a building automation system address that may then be stored in a memory of the system sensor. The building automation system address may be used during subsequent communication between the system sensor and the central controller. This may be continued until all of the system sensors have enrolled in the building automation system.

Figure 6:
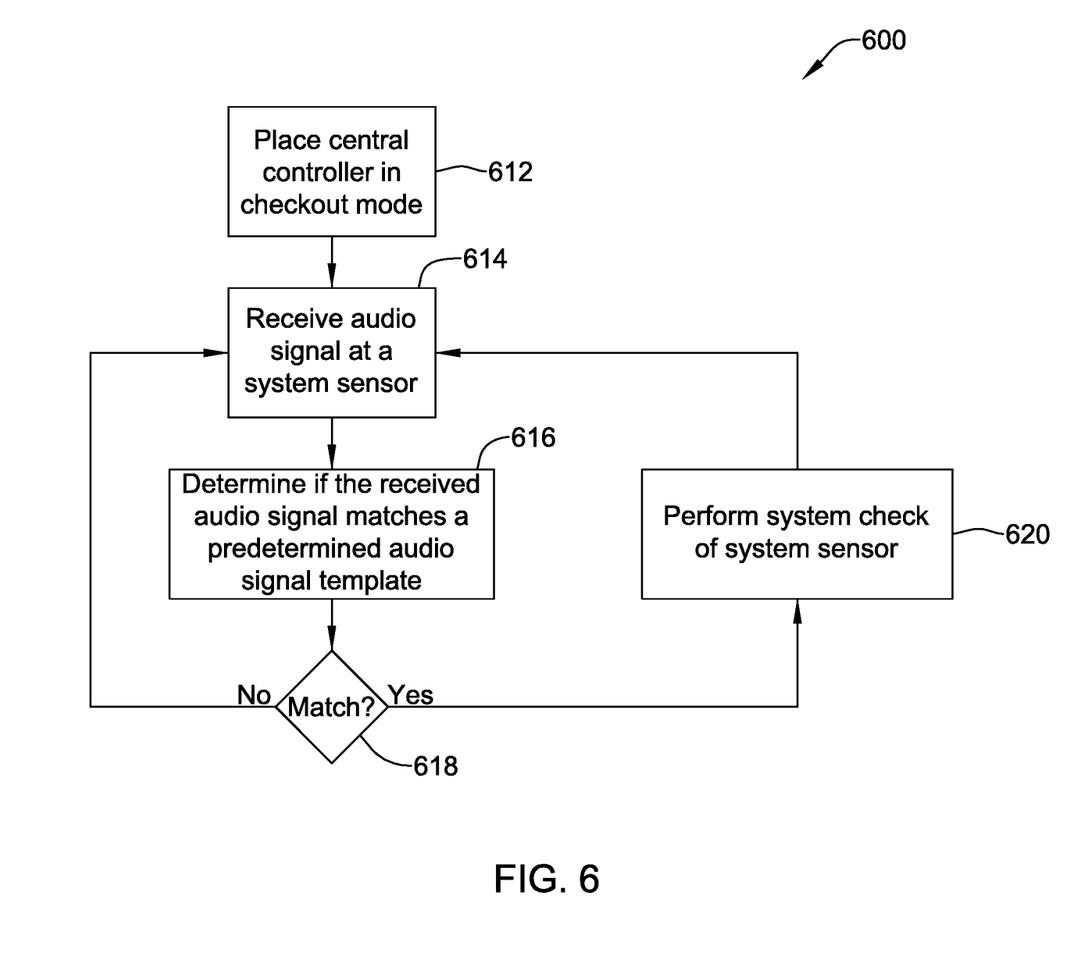
FIG. 6 is a flow chart of an illustrative method for performing a system check of a building automation system such as security system.

FIG. 6 is a flow chart of an illustrative method for initiate checkout mode in a building automation system such as security system in a building. The method is generally shown at 600. Once the system sensors are enrolled with a central controller of the building automation system, the central controller may be placed into a checkout mode, as shown at 612. Then, the installer may walk around the building uttering a predetermined audible checkout trigger word or phrase. One of the system sensors may receive the uttered audible checkout trigger word or phrase as an audio signal, as shown at 614. The system sensor may then determine if the received audio signal matches a predetermined audio signal template, as shown at 616. The predetermined audio signal template may correspond to the predetermined checkout trigger word or phrase discussed above. As shown at 618, if the system sensor determines that the received audio signal does not match the predetermined audio signal template, control is passed back to 614, wherein the system sensor may continue to receive audio signals. If, however, the system sensor determines that the received audio signal does match the predetermined audio signal template, control is passed to 620 and the system sensor performs a system check. The system check may include sending a trigger event (e.g. an alarm event) to the central controller, which may then be confirmed by an audio beep, a flash or some other feedback if desired. This may be continued until all of the system sensors have performed a system check.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A security system sensor for use in a building security system having a central controller, the security system sensor comprising:
   a wireless transceiver;
   a microphone; and a local controller operatively coupled to the wireless transceiver and the microphone, the local controller configured to:
before entering an enrollment mode, receive a single spoken phrase that includes a first portion and a second portion via the microphone;
use a recognition engine to determine whether the first portion of the single spoken phrase received corresponds to a predetermined enrollment trigger word or phrase;
enter the enrollment mode when the first portion of the single spoken phrase received corresponds to the predetermined enrollment trigger word or phrase;
responsive to entering the enrollment mode, identify the second portion of the single spoken phrase received as a registration name for the security system sensor, transmit a new device message that includes the registration name via the wireless transceiver, receive a security system address from the central controller, and store the security system address in a memory of the security system sensor;
responsive to transmitting the new device message, receive an enrollment confirmation message; and
responsive to receiving the enrollment confirmation message, disable the recognition engine.

2. The security system sensor of claim 1, wherein the recognition engine recognizes a voice speaking the predetermined enrollment trigger word or phrase.

3. The security system sensor of claim 1, wherein the local controller is further configured to:
use the security system address in subsequent communications with the central controller outside of the enrollment mode.

4. The security system sensor of claim 1, wherein the local controller is further configured to:
determine whether the single spoken phrase received corresponds to a predetermined system check trigger word or phrase; and
perform a system check when the single spoken phrase received corresponds to the predetermined system check trigger word or phrase.

5. A method for enrolling a security system sensor in a security system, the method comprising:
entering an enrollment mode at a central controller;
before entering the enrollment mode, receiving, at the security system sensor a single verbal command from a user proximate to the security system sensor, the single verbal command including a first portion and a second portion, wherein the security system sensor is installed in an area to be secured;
using a recognition engine of the security system sensor to determine whether the first portion of the single verbal command received matches a predetermined word or phrase;
when the first portion of the single verbal command received matches the predetermined word or phrase, entering the enrollment mode at the security system sensor;
when in the enrollment mode, identifying, at the security system sensor, the second portion of the single verbal command received as a registration name for the security system sensor, transmitting a new device message that includes the registration name from the security system sensor to the central controller, receiving a security system address from the central controller at the security system sensor, and storing the security system address in a memory of the security system sensor;
responsive to the central controller receiving the new device message, using the registration name to enroll the security system sensor into the security system and transmitting an enrollment confirmation message to the security system sensor; and
responsive to the security system sensor receiving the enrollment confirmation message, disabling the recognition engine of the security system sensor.

6. The method of claim 5, wherein the security system sensor includes a microphone that receives the single verbal command.

7. The method of claim 5, further comprising:
when in the enrollment mode, initiating a wireless enrollment communication with the central controller to transmit the new device message from the security system sensor to the central controller.

8. The method of claim 5, further comprising:
determining whether the single verbal command received by the security system sensor matches a check trigger word or phrase; and
when the single verbal command received matches the check trigger word or phrase, initiating a system check by communicating an alarm condition from the security system sensor to the central controller.

9. The method of claim 5, wherein the security system sensor includes one of a limit-switch, a motion sensor, a glass break sensor, a door sensor, a window sensor, a video camera, a smoke sensor, a carbon monoxide sensor, and a natural gas sensor.

10. The method of claim 5 wherein, when not in the enrolment mode, using the security system address in subsequent communications between the security system sensor and central controller.

* * * * *